United States Patent
Ichihara et al.

(10) Patent No.: US 9,458,785 B2
(45) Date of Patent: Oct. 4, 2016

(54) EGR CONTROLLER FOR INTERNAL COMBUSTION ENGINE

(75) Inventors: Hideaki Ichihara, Obu (JP); Hiroki Nogami, Kariya (JP); Hiroshi Katsurahara, Okazaki (JP); Hiroyuki Takezoe, Kariya (JP)

(73) Assignee: DENSO CORPORATION, Kariya (JP)

( * ) Notice: Subject to any disclaimer, the term of this patent is extended or adjusted under 35 U.S.C. 154(b) by 821 days.

(21) Appl. No.: 13/489,715

(22) Filed: Jun. 6, 2012

(65) Prior Publication Data

US 2012/0318246 A1 Dec. 20, 2012

(30) Foreign Application Priority Data

Jun. 17, 2011 (JP) .................................. 2011-134842

(51) Int. Cl.
*F02D 41/14* (2006.01)
*F02D 41/00* (2006.01)
(Continued)

(52) U.S. Cl.
CPC ....... *F02D 41/1498* (2013.01); *F02D 41/0055* (2013.01); *F02D 41/0065* (2013.01); *F02D 41/2438* (2013.01); *F02D 41/2464* (2013.01); *F02P 5/1508* (2013.01); *F02D 41/08* (2013.01);
(Continued)

(58) Field of Classification Search
CPC ............. F02M 25/07; F02M 25/0754; F02M 25/0702; F02M 25/0756; F02M 25/0772; F02M 25/0773; F02M 26/48; Y02T 10/47; Y02T 10/121; Y02T 10/46; F02D 41/0072; F02D 41/1401; F02D 41/006; F02D 41/0062; F02D 41/0065; F02D 41/1445; F02D 41/1458; F02D 41/1498; F02D 41/0055; F02D 41/2438; F02D 41/2464; F02D 41/08; F02D 41/2441; F02D 2250/16; F02P 5/1508

USPC ......... 123/568, 568.11, 568.14, 568.16, 480, 123/568.21; 60/278, 605.2; 701/108; 73/114.74
See application file for complete search history.

(56) References Cited

U.S. PATENT DOCUMENTS 5,921,224 A * 7/1999 Sinnamon ........... F02D 41/0077
123/568.21
6,378,515 B1 * 4/2002 Geyer ..................... F02D 21/08
123/683
(Continued)

FOREIGN PATENT DOCUMENTS

JP 07-233752 9/1995
JP H07233752 * 9/1995
(Continued)

OTHER PUBLICATIONS

Office Action (2 pages) dated Apr. 28, 2014 issued in corresponding Japanese Application No. 2011-134842 and English translation (2 pages).

*Primary Examiner* — Hung Q Nguyen
*Assistant Examiner* — John Bailey
(74) *Attorney, Agent, or Firm* — Nixon & Vanderhye P.C.

(57) ABSTRACT

While an engine is an idling state and an EGR opening degree is increased stepwise from a specified opening degree, a variation in engine speed (a standard deviation in engine speed) is repeatedly computed. After that, a specified step amount is successively reduced from the EGR opening degree and the variation in engine speed is successively computed until the EGR opening degree becomes less than or equal to a specified value. Then, a maximum value of the EGR opening degrees where the variation in engine speed becomes minimum is learned as the full-close position.

4 Claims, 11 Drawing Sheets

(51) Int. Cl.
  *F02D 41/24* (2006.01)
  *F02P 5/15* (2006.01)
  *F02D 41/08* (2006.01)

(52) U.S. Cl.
  CPC ....... *F02D 41/2441* (2013.01); *F02D 2250/16* (2013.01); *F02M 26/48* (2016.02); *Y02T 10/46* (2013.01); *Y02T 10/47* (2013.01)

(56) References Cited

U.S. PATENT DOCUMENTS

| | | | | |
|---|---|---|---|---|
| 7,013,879 | B2* | 3/2006 | Brookshire | F02B 37/001 123/568.12 |
| 7,231,905 | B1* | 6/2007 | Haskara | F02D 35/028 123/435 |
| 7,231,906 | B1* | 6/2007 | Haskara | F02D 35/028 123/435 |
| 7,717,098 | B2* | 5/2010 | Nakano | F02D 31/005 123/480 |
| 2006/0196485 | A1* | 9/2006 | Kimura | F02M 26/48 123/568.16 |
| 2006/0235603 | A1* | 10/2006 | Kobayashi | F02D 41/0072 701/108 |
| 2007/0043498 | A1* | 2/2007 | McLain | F02D 41/0077 701/108 |
| 2007/0074707 | A1* | 4/2007 | Ogawa | F02D 13/0265 123/568.14 |
| 2008/0295514 | A1* | 12/2008 | Ono | F01N 3/035 60/602 |
| 2009/0164106 | A1* | 6/2009 | Enomoto | F02D 41/0055 701/111 |
| 2010/0024787 | A1* | 2/2010 | Chi | F02D 41/1401 123/568.11 |
| 2010/0031938 | A1* | 2/2010 | Lim | F02M 26/16 123/568.17 |
| 2010/0199639 | A1* | 8/2010 | Matsunaga | F01N 3/0842 60/278 |
| 2011/0011378 | A1* | 1/2011 | Nakamura | F02D 41/1495 123/568.16 |
| 2011/0062358 | A1* | 3/2011 | Kawamura | F16K 31/04 251/129.01 |

FOREIGN PATENT DOCUMENTS

| | | | |
|---|---|---|---|
| JP | 08-093572 | | 4/1996 |
| JP | H0893572 | * | 4/1996 |
| JP | 2560777 | | 9/1996 |
| JP | B 0002560777 | * | 9/1996 |
| JP | 2001-82260 | | 3/2001 |
| JP | A 2001082260 | * | 3/2001 |
| JP | 2002-195091 | | 7/2002 |
| JP | 2002195091 | * | 7/2002 |
| JP | 2007-186998 | | 7/2007 |
| JP | 2007186998 | * | 7/2007 |
| JP | 2010001790 A | * | 1/2010 |
| JP | 2010090865 A | * | 4/2010 |
| JP | 2010-185424 | | 8/2010 |
| JP | 2010185424 A | * | 8/2010 |

* cited by examiner

EGR CONTROLLER FOR INTERNAL COMBUSTION ENGINE

CROSS-REFERENCE TO RELATED APPLICATION

This application is based on Japanese Patent Application No. 2011-134842 filed on Jun. 17, 2011, the disclosure of which is incorporated herein by reference.

TECHNICAL FIELD

The present invention relates to an exhaust gas recirculation (EGR) controller for an internal combustion engine, which is provided with an EGR valve which controls an exhaust gas quantity recirculating into an intake pipe.

BACKGROUND

In order to reduce exhaust emission, an internal combustion engine is provided with an exhaust gas recirculation (EGR) apparatus. The EGR apparatus has an EGR valve disposed in an EGR passage. The EGR valve adjusts quantity of EGR gas recirculating into an intake pipe through the EGR passage.

For example, Japanese patent No. 2560777 discloses an internal combustion engine having an EGR apparatus. An oxygen sensor is provided in an intake pipe. Based on output signals of the oxygen sensor, an opening degree of the EGR valve of when the EGR gas starts to recirculate is detected. Further, JP-2001-82260A discloses an internal combustion engine having an EGR apparatus in which an intake pressure sensor is provided in the intake pipe to detect an intake pressure. Based on the detected intake pressure, an opening degree of the EGR valve of when the EGR gas starts to recirculate is learned.

Especially, in a gasoline engine, since a sensitivity of combustion stability relative to an EGR gas quantity is relatively high, it is necessary to control the EGR gas quantity with high accuracy. When the exhaust gas recirculation is stopped, it is necessary for the EGR valve to accurately fully close the EGR passage to avoid an EGR gas leakage. Thus, it is necessary to accurately learn a full close position of the EGR valve.

SUMMARY

It is an object of the present disclosure to provide an exhaust gas recirculation (EGR) controller for an internal combustion engine, which is able to accurately learn a full-close position of an EGR valve.

According to the present disclosure, an exhaust gas recirculation controller for an internal combustion engine includes an EGR valve controlling an exhaust gas quantity recirculating into an intake pipe. The EGR valve is driven in a direction where an opening degree of the EGR valve is increased and in a direction where the opening degree of the EGR valve is decreased with respect to a full-close position of the EGR valve where the recirculating exhaust gas quantity becomes a minimum value. The exhaust gas recirculation controller further includes a full-close-position learning portion for learning the full-close position based on a behavior of the internal combustion engine relative to the opening degree of the EGR valve.

A behavior of the engine varies according to an EGR gas quantity which depends on an opening degree of the EGR valve. Thus, based on the behavior of the engine relative to the EGR opening degree, the full-close position of the EGR valve can be accurately learned. Furthermore, since no additional sensor is necessary for learning the full-close position, the apparatus can be configured with low cost.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present invention will be described, hereinafter.

[First Embodiment]

Referring to FIGS. 1 to 6, a first embodiment will be described hereinafter. An engine control system is schematically explained based on FIG. 1. An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor 17 detecting a throttle position (throttle opening degree) are provided downstream of the air flow meter 14.

Figure 1:
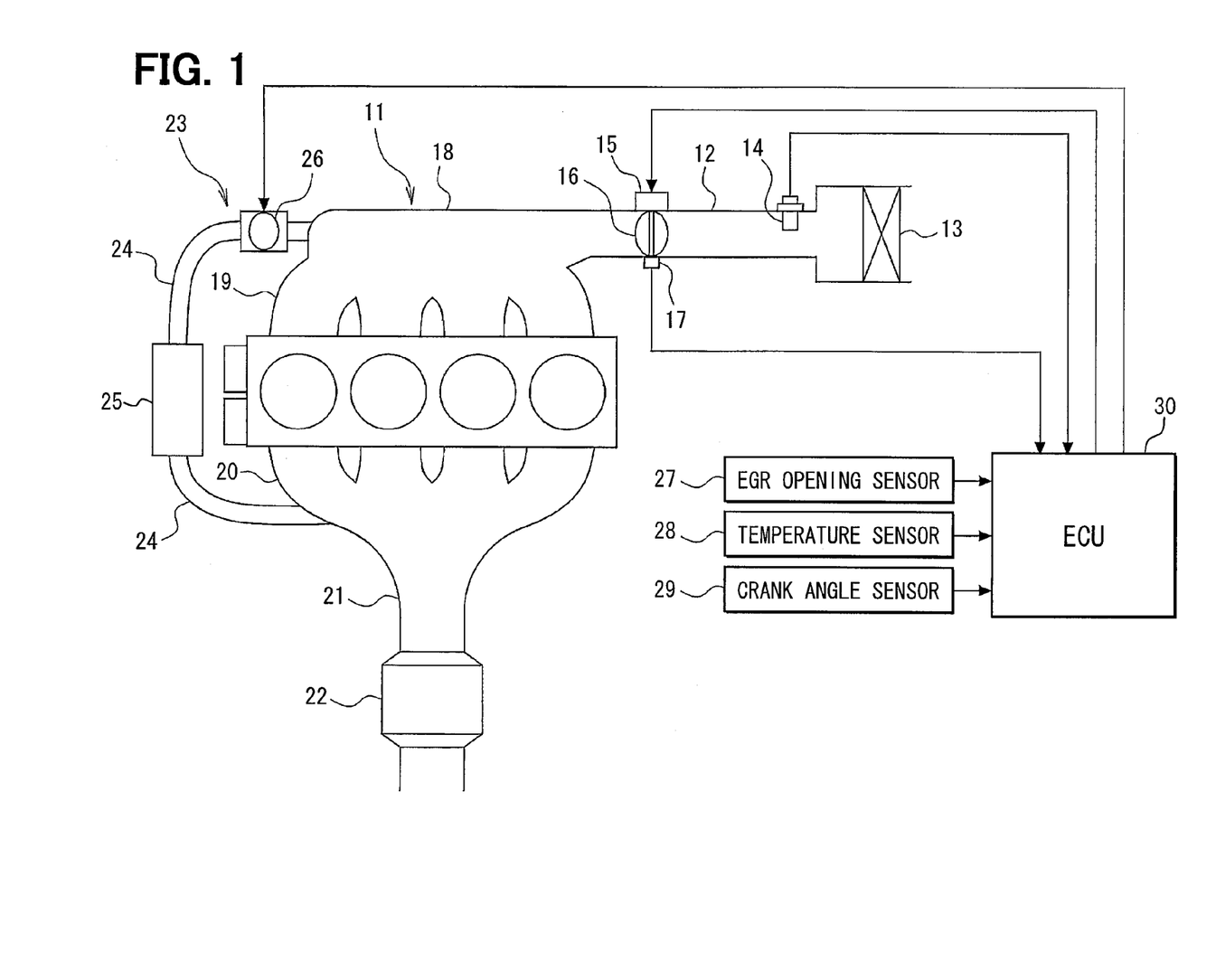
FIG. 1 is a schematic view of an engine control system according to a first embodiment of the present invention.

A surge tank 18 is provided downstream of the throttle valve 16. An intake manifold 19 which introduces air into each cylinder of the engine 11 is provided downstream of the surge tank 18, and a fuel injector (not shown) which injects fuel is provided for each cylinder. A spark plug (not shown) is mounted on a cylinder head of the engine 11 corresponding to each cylinder to ignite air-fuel mixture in each cylinder.

An exhaust manifold 20 of each cylinder is connected to an exhaust pipe 21. The exhaust pipe 21 (exhaust passage)

is provided with a three-way catalyst 22 which reduces CO, HC, NOx, and the like contained in exhaust gas.

The engine 11 is provided with an EGR apparatus 23 which recirculates a part of exhaust gas flowing through an exhaust passage upstream of the catalyst 22 into an intake passage downstream of the throttle valve 16. The EGR apparatus 23 has an EGR pipe 24 connecting the exhaust pipe 21 downstream of the catalyst 22 and the intake pipe 12 downstream of the throttle valve 16. An EGR cooler 25 for cooling the EGR gas and an EGR valve 26 for adjusting an exhaust gas recirculation quantity (EGR-quantity) are provided in the EGR pipe 24. The EGR valve 26 is a butterfly valve. The EGR valve 26 is driven by a motor (not shown) and its opening degree is detected by an EGR opening sensor 27.

Figure 2A:
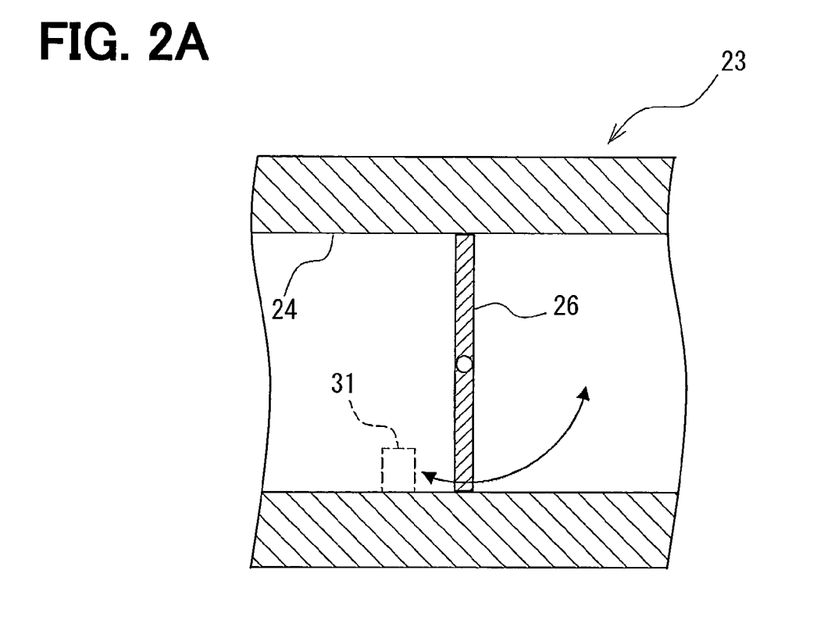
FIGS. 2A and 2B are charts for explaining a movable range of an EGR valve.
Figure 2B:
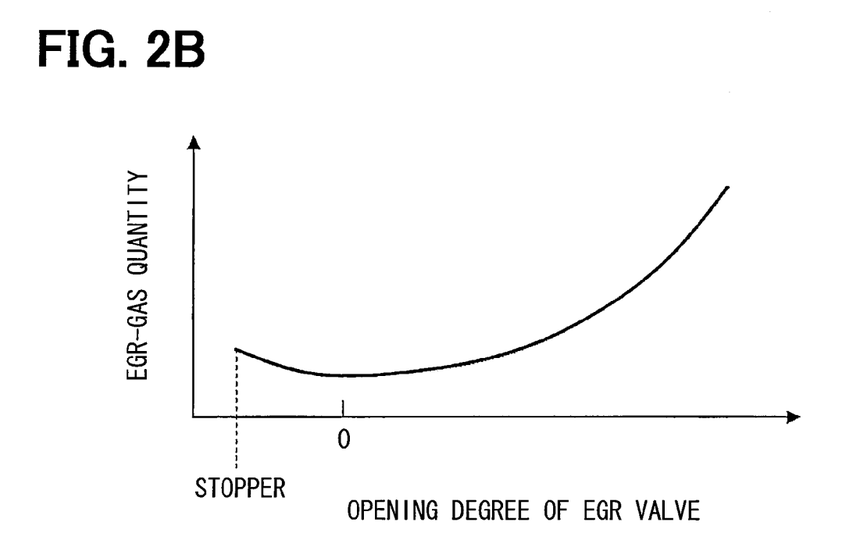

As shown in FIGS. 2A and 2B, when the EGR valve 26 is rotated from a full-close position by small degree, the EGR valve 26 is brought into contact with the stopper 31 provided in a gear box of the EGR valve 26. The EGR valve 26 can rotate in a valve-close direction and a valve-open direction (clockwise and anticlockwise) with respect to the full-close position. Therefore, the full-close position of the EGR valve 26 does not agree with the position at which the EGR valve 26 is in contact with the stopper 31.

Further, as shown in FIG. 1, the engine 11 is provided with a coolant temperature sensor 28 detecting coolant temperature and a crank angle sensor 29 outputting a pulse signal every when the crank shaft (not shown) rotates a specified crank angle. Based on the output signal of the crank angle sensor 29, a crank angle and an engine speed are detected.

The outputs of the above sensors are transmitted to an electronic control unit (ECU) 30. The ECU 30 includes a microcomputer which executes an engine control program stored in a Read Only Memory (ROM) to control a fuel injection quantity, an ignition timing, a throttle position (intake air flow rate) and the like.

The ECU 30 computes a target EGR quantity or a target EGR rate according to an engine driving condition (engine speed, engine load and the like). The ECU 30 controls the opening degree of the EGR valve 26 to obtain the target EGR quantity or the target EGR rate. For example, the ECU 30 computes a target opening degree of the EGR valve 26 based on the target EGR quantity or the target EGR rate. The EGR valve 26 is driven so that the opening degree detected by the sensor 27 agrees with the target opening degree of the EGR valve 26.

Especially, in a gasoline engine, since a sensitivity of combustion stability relative to an EGR gas quantity is relatively high, it is necessary to control the EGR gas quantity with high accuracy. When the exhaust gas recirculation is stopped, it is necessary for the EGR valve 26 to accurately fully close the EGR passage to avoid an EGR gas leakage. Thus, it is necessary to accurately learn a full-close position of the EGR valve 26.

The full-close position does not correspond to a position of the stopper 31.

Figure 3:
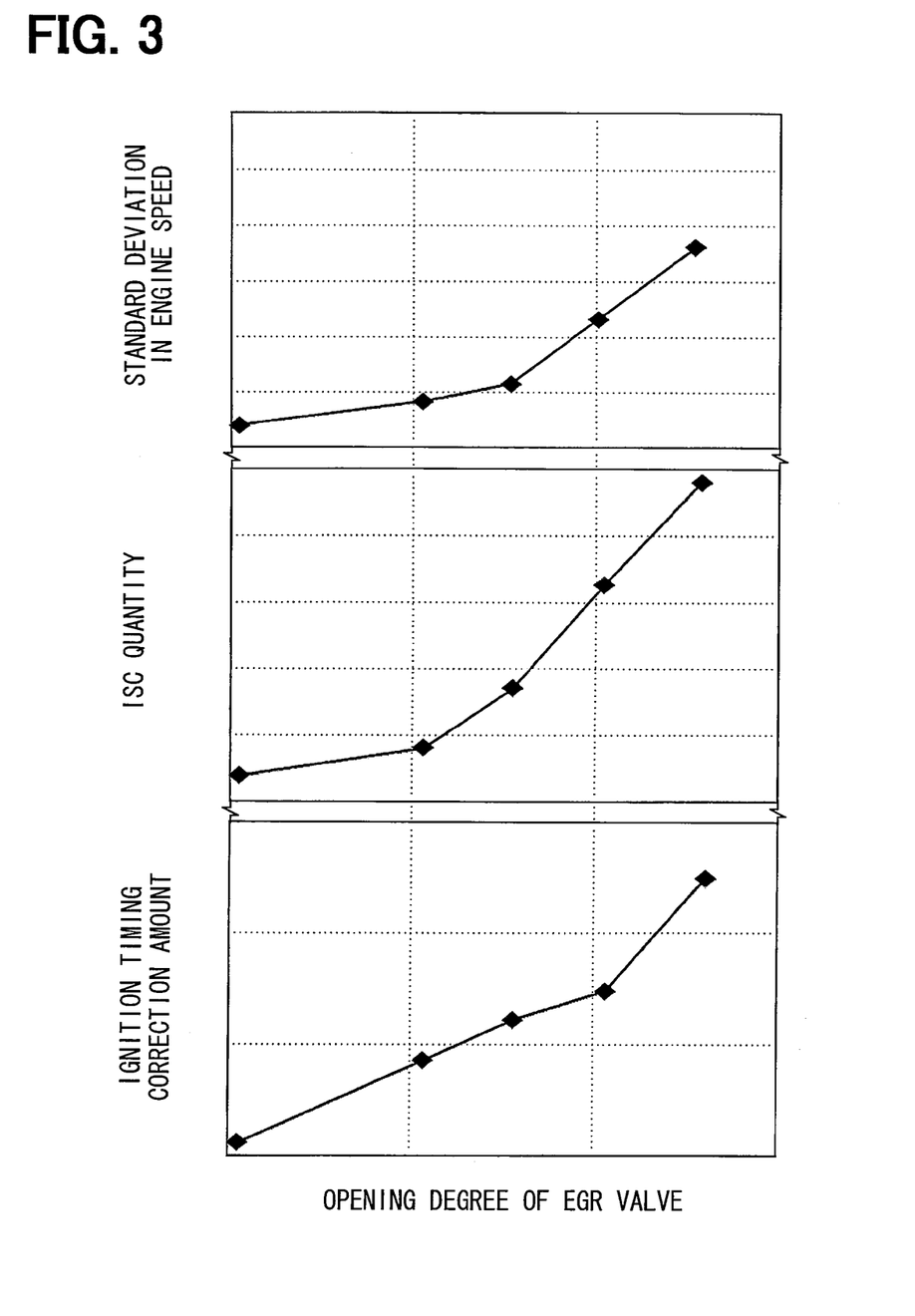
FIG. 3 is a chart showing a relationship between an opening degree of the EGR valve and a standard deviation in engine speed, between the opening degree of the EGR valve and an idle speed control (ISC) quantity, and between the opening degree of the EGR valve and an ignition timing correction amount.

The ECU 30 learns a full-close position of the EGR valve 26 based on a variation in engine speed relative to an opening degree of the EGR valve 26. The opening degree of the EGR valve 26 is referred to as EGR opening degree, hereinafter. As shown in FIG. 3, the EGR gas quantity varies according to the EGR opening degree, and a combustion condition of the engine 11 varies according to the EGR gas quantity. When the combustion condition varies, a variation in engine speed (for example, a standard deviation in engine speed) also varies. Thus, based on a variation in engine speed relative to the EGR opening degree, the full-close position of the EGR valve 26 can be accurately learned.

Figure 4:
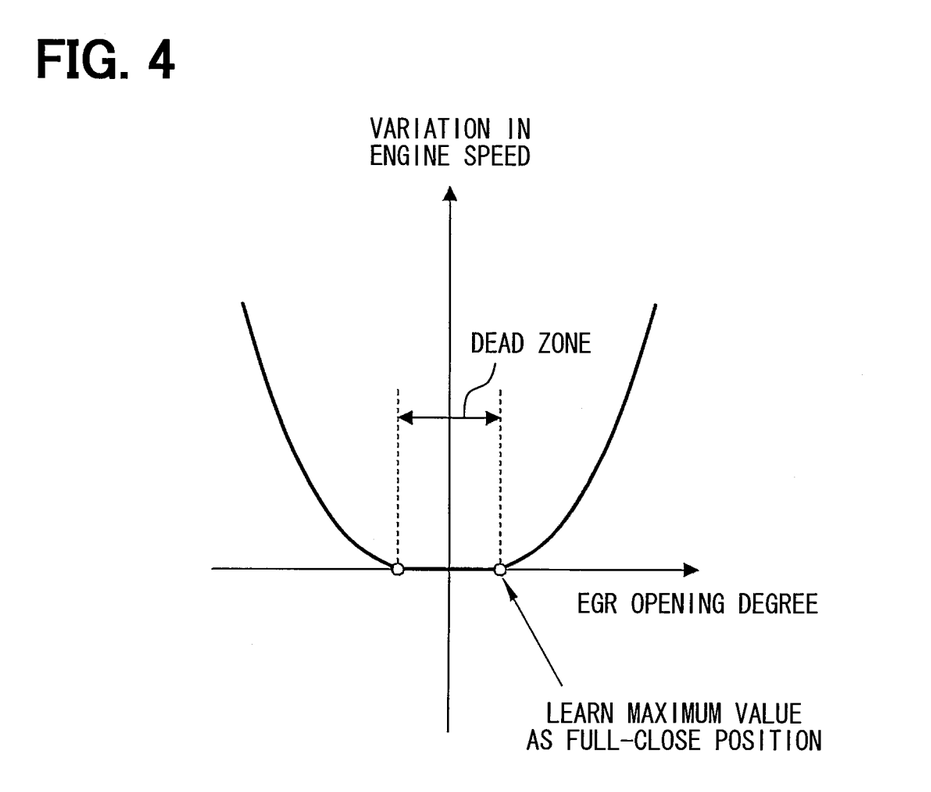
FIG. 4 is a chart for explaining a characteristic of a full-close-position learning according to a first embodiment.
Figure 5:
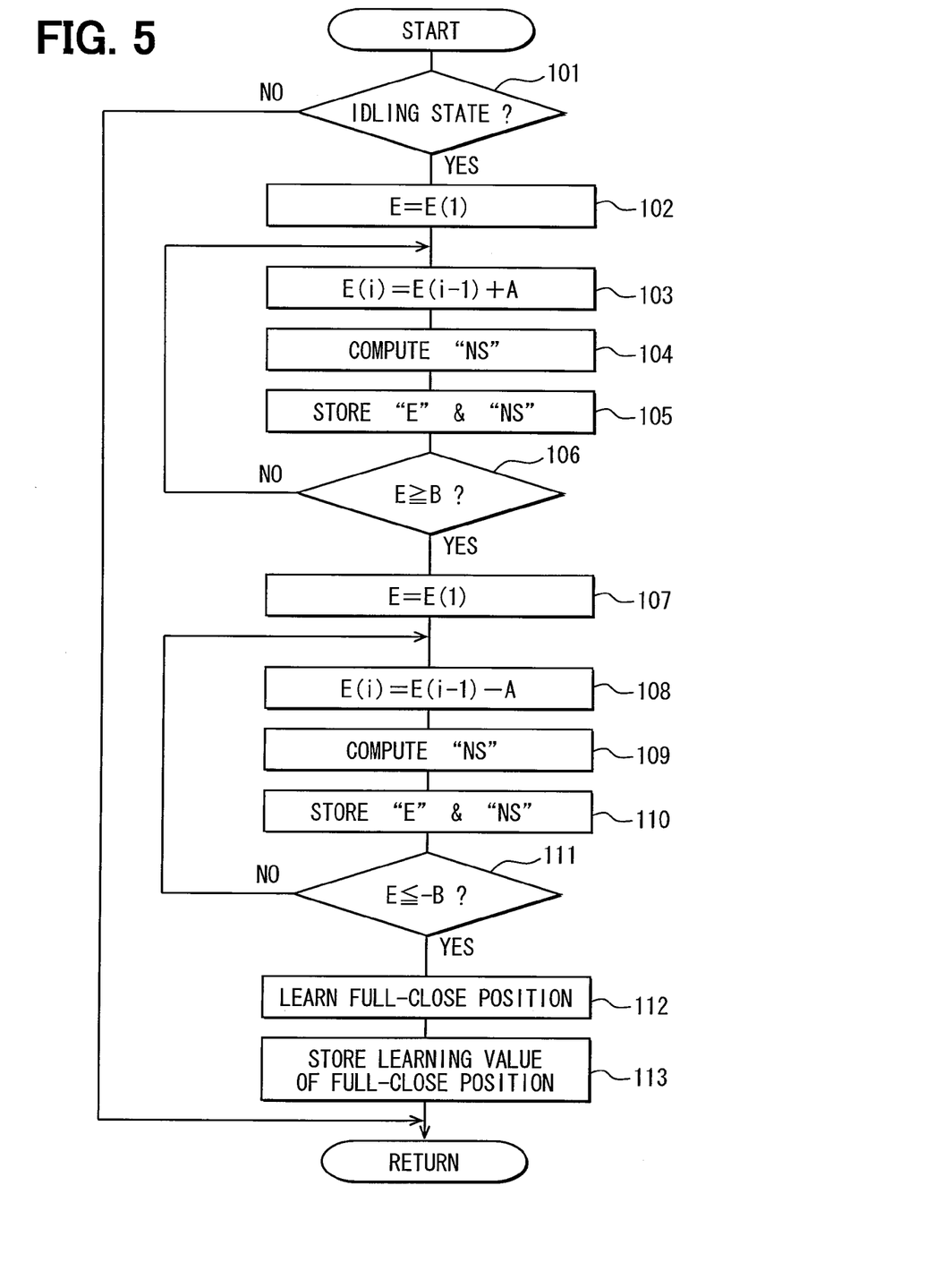
FIG. 5 is a flow chart showing a processing of a full-close-position learning routine according to the first embodiment.

In the present embodiment, the ECU 30 performs a full-close-position learning routine shown in FIG. 5. While the EGR opening degree is increased stepwise from a specified opening degree (for example, initially designed full-close position), the variation in engine speed (for example, a standard deviation in engine speed) is repeatedly computed. After that, the EGR opening degree is decreased stepwise from a specified opening degree and the variation in engine speed is repeatedly computed. Then, a maximum value of the EGR opening degrees where the variation in engine speed becomes minimum is learned as the full-close position, as shown in FIG. 4.

Referring to FIG. 5, the processes of the full-close-position learning routine will be described hereinafter.

The full-close-position learning routine is executed at a specified cycle while the ECU 36 is ON. This full-close-position learning routine corresponds to a full-close position learning portion. In step 101, the computer determines whether the engine 11 is at idling state. When the answer is NO, the procedure ends.

When the answer is YES in step 101, the procedure proceeds to step 102. In step 102, a target EGR opening degree "E" is set to a specified degree "E(1)" and the opening degree of the EGR valve 26 is brought into the specified degree "E(1)". The specified degree "E(1)" is set to an initially designed full-close position (for example, 0 deg).

Then, the procedure proceeds to step 103 in which the target EGR opening degree "E" is increased by a specified step amount "A".

Target EGR opening degree $E(i)$=Target EGR opening degree $E(i-1)+A$

Then, the procedure proceeds to step 104 in which a variation in engine speed "NS" is computed. In this case, for example, a standard deviation of the engine speed in a predetermined period is computed as the variation in engine speed "NS". Alternatively, a maximum value or an average value of the variation in engine speed in a specified time period may be computed as the engine speed variation "NS". Then, the procedure proceeds to step 105 in which the current target EGR opening degree "E" and the engine speed variation "NS" are stored in a memory.

Then, the procedure proceeds to step 106 in which the computer determines whether the target EGR opening degree "E" is greater than or equal to a specified value "B". When the answer is NO, the procedure goes back to step 103.

When the answer is YES in step 106, the procedure proceeds to step 107 in which the target EGR opening degree "E" is set to the specified degree "E(1)" and the EGR opening degree is brought back to the degree "E(1)".

Then, the procedure proceeds to step 108 in which the target EGR opening degree "E" is decreased by the specified step amount "A".

Target EGR opening degree $E(i)$=Target EGR opening degree $E(i-1)-A$

Then, the procedure proceeds to step 109 in which a current engine speed variation "NS" is computed. Then, the procedure proceeds to step 110 in which the current target EGR opening degree "E" and the engine speed variation "NS" are stored in a memory.

Then, the procedure proceeds to step 111 in which the computer determines whether the target EGR opening degree "E" is less than or equal to a specified value "−B". When the answer is NO, the procedure goes back to step 108.

When the answer is YES in step 111, the procedure proceeds to step 112. In step 112, the EGR opening degree is varied (increased or decreased) from the specified degree "E(1)" and a maximum value of the EGR opening degrees where the engine speed variation "NS" becomes minimum is learned as the full-close position. The target EGR opening degree is set to the full-close position. If the engine speed variation "NS" becomes minimum at a single EGR opening degree, this EGR opening degree is learned as the full-close position.

Then, the procedure proceeds to step 113 in which the learning value of the full-close position is stored in a nonvolatile memory, such as a backup RAM of the ECU 30. While the engine is at idling state, the learning of the full-close position may be performed only once.

Figure 6:
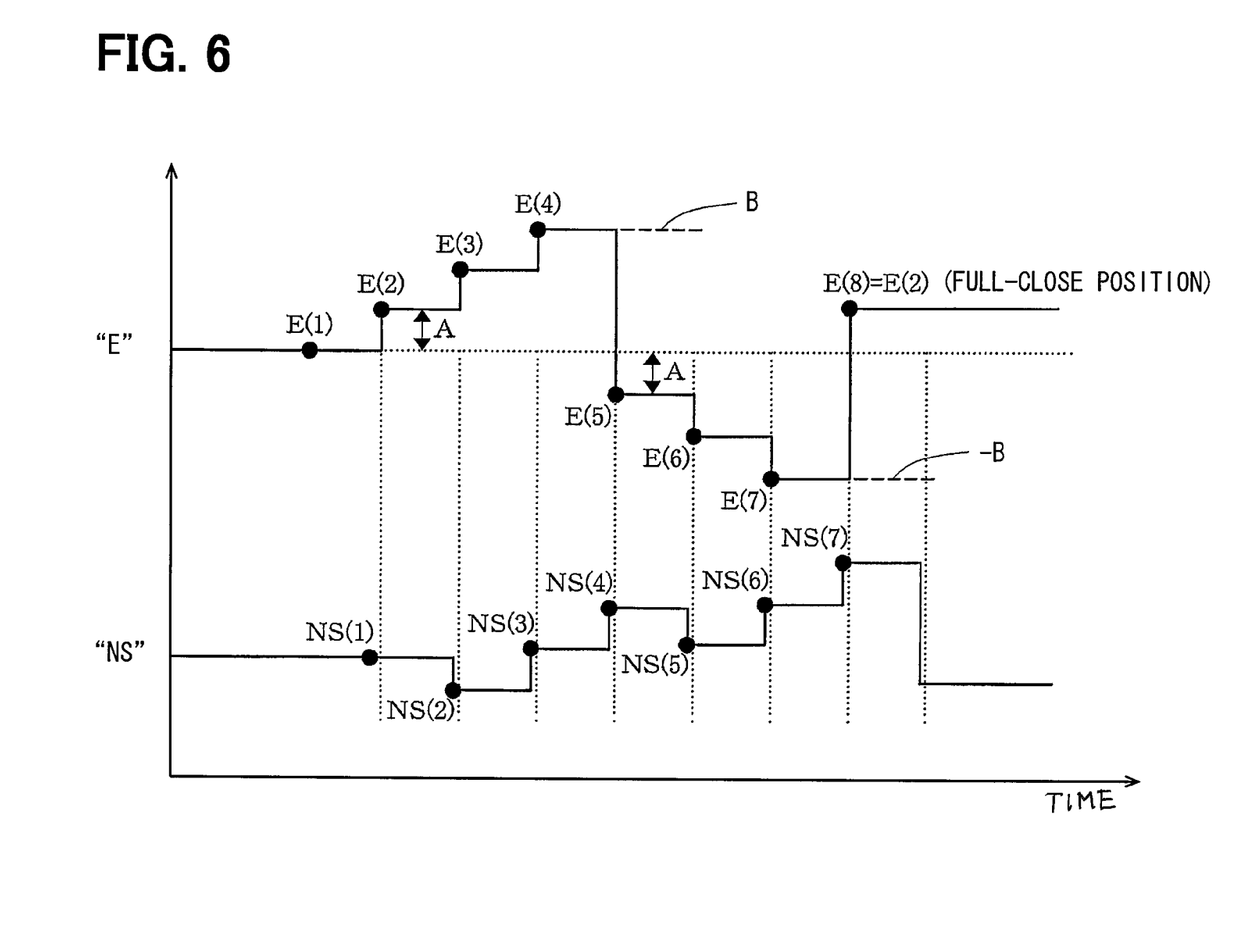
FIG. 6 is a time chart for explaining a full-close-position learning according to the first embodiment.

Referring to a time chart shown in FIG. 6, the processing of the full-close position learning will be described, hereinafter. While the engine is idling state, the target EGR opening degree "E" is set to the degree "E(1)". The specified step amount "A" is successively added to the degree "E(1)" and the engine speed variation "NS" is successively computed until the target EGR opening degree "E" becomes greater than or equal to the specified value "B".

After that, the target EGR opening degree "E" is brought back to the degree "E(1)" and the specified step amount "A" is successively reduced from the degree "E(1)" and the engine speed variation "NS" is successively computed until the target EGR opening degree "E" becomes less than or equal to the specified value "−B".

After that, when the EGR opening degree is varied (increased or decreased) from the specified degree "E(1)", a maximum value of the EGR opening degrees where the engine speed variation "NS" becomes minimum is learned as the full-close position. The target EGR opening degree "E" is set to the full-close position. In FIG. 6, the target EGR opening degree "E(8)=E(2)" is learned as the full-close position.

According to the above first embodiment, the EGR gas quantity varies according to the EGR opening degree, and a combustion condition of the engine 11 varies according to the EGR gas quantity. When the combustion condition varies, a variation in engine speed (for example, a standard deviation in engine speed) also varies. Since the full-close position of the EGR valve 26 is learned based on the variation in engine speed, the full-close position of the EGR valve 26 can be learned with high accuracy. Furthermore, since no additional sensor is necessary for learning the full-close position, the apparatus can be configured with low cost.

Moreover, according to the first embodiment, the full-close position is learned based on the variation in engine speed when the EGR opening degree is increased from the specified degree and when the EGR opening degree is decreased from the specified degree. Thus, even if the full-close position of the EGR valve 26 deviated from the specified degree "E(1)" in increasing direction or in decreasing direction, the full-close position can be learned.

The EGR apparatus 23 has a dead zone where the variation in engine speed becomes minimum, as shown in FIG. 4. In this dead zone, the EGR gas quantity also becomes minimum value.

According to the first embodiment, when the EGR opening degree is varied (increased or decreased) from the specified degree, the maximum value of the EGR opening degrees where the variation in engine speed becomes minimum is learned as the full-close position. Thus, even if a dead zone where the EGR gas quantity becomes minimum exists, the maximum value of the EGR opening degree where the EGR gas quantity becomes minimum can be learned as the full-close position. Further, since the maximum value of the EGR opening degree is learned as the full-close position, a responsiveness of EGR gas quantity control can be enhanced.

Moreover, since the learning value of the full-close position is stored in a nonvolatile memory, the EGR valve 26 can be always controlled based on the newest learning value of the full-close position.

[Second Embodiment]

Figure 7:
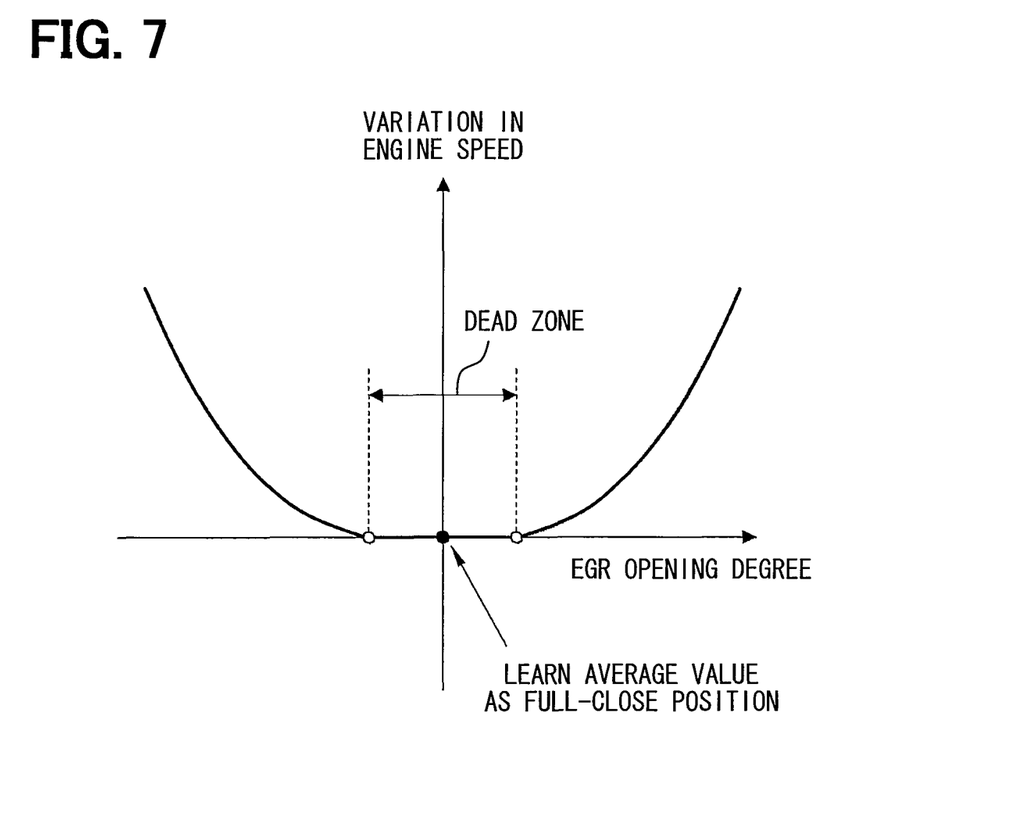
FIG. 7 is a chart for explaining a characteristic of a full-close-position learning according to a second embodiment.
Figure 8:
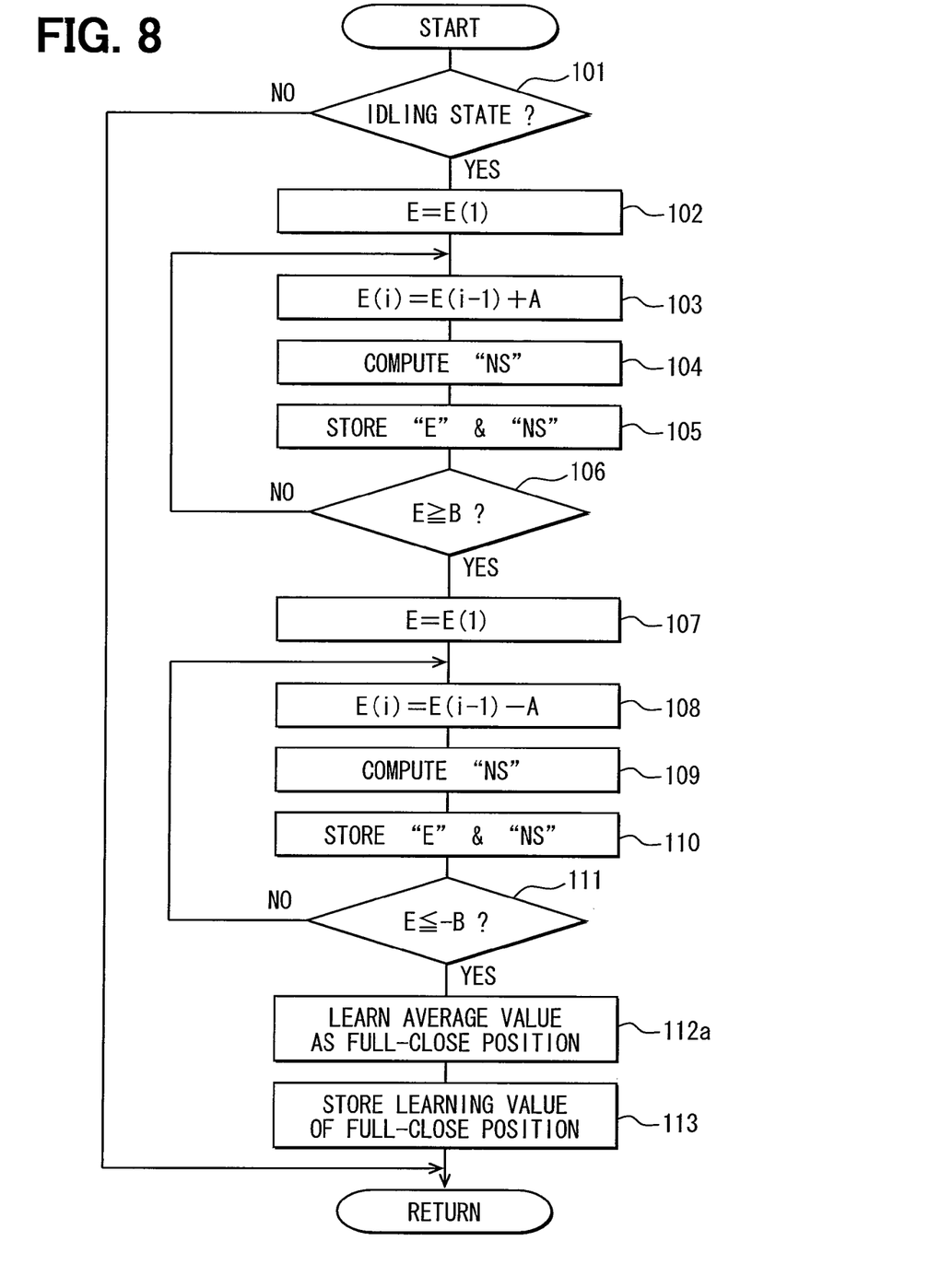
FIG. 8 is a flow chart showing a processing of a full-close-position learning routine according to the second embodiment.
Figure 9:
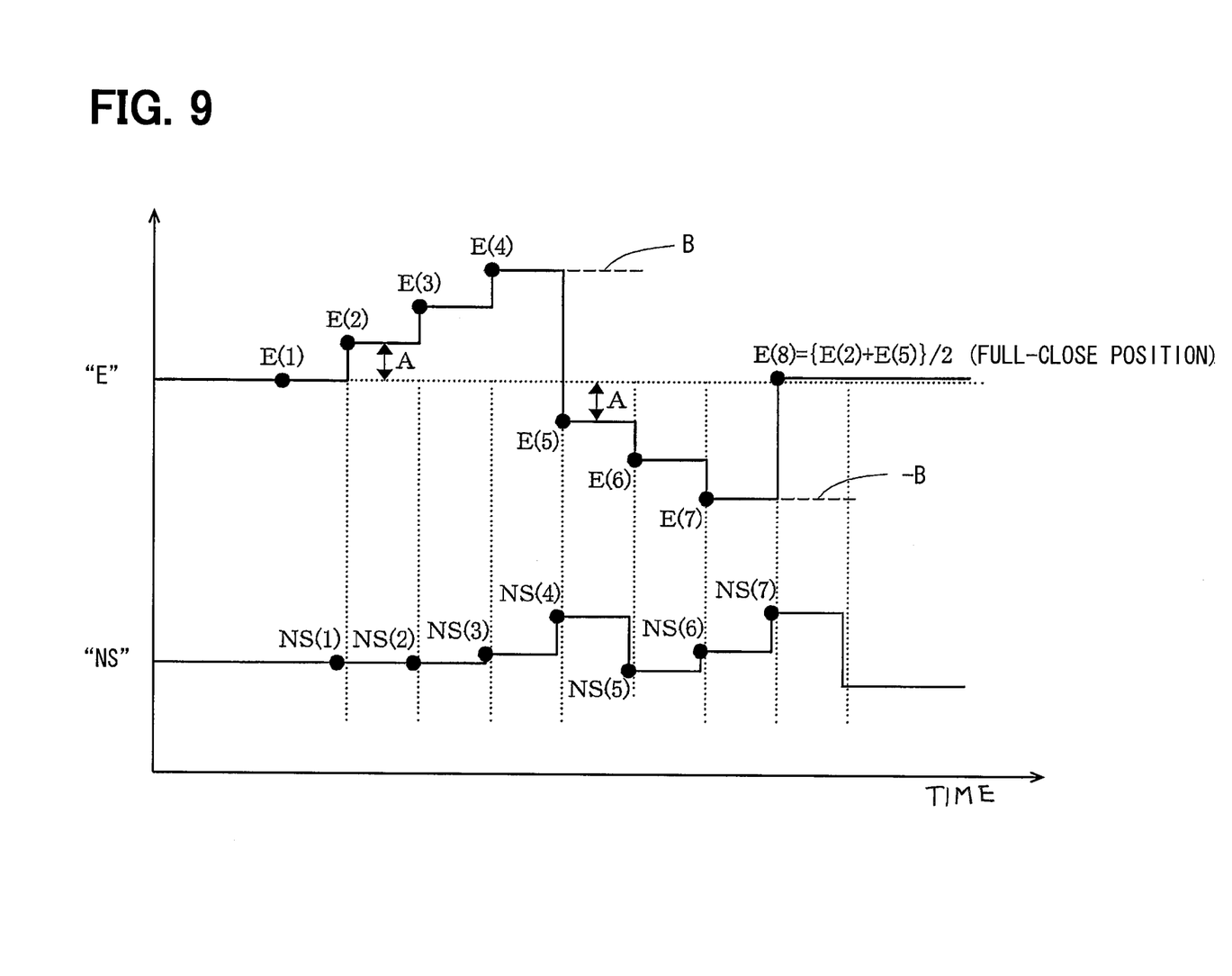
FIG. 9 is a time chart for explaining a full-close-position learning according to the second embodiment.

Referring to FIGS. 7 to 9, a second embodiment will be described hereinafter. In the second embodiment, the same parts and components as those in the first embodiment are indicated with the same reference numerals and the same descriptions will not be reiterated.

According to the above first embodiment, when the EGR opening degree is varied (increased or decreased) from the specified degree, the maximum value of the EGR opening degrees where the variation in engine speed becomes minimum is learned as the full-close position. In the second embodiment, the ECU 30 performs a full-close-position learning routine shown in FIG. 8. Then, an average of a maximum value and a minimum value of the EGR opening degrees where the variation in engine speed becomes minimum is learned as the full-close position, as shown in FIG. 7.

The process in step 112 in FIG. 5 is replaced by process in step 112a in FIG. 8. The other steps in FIG. 8 are the same as those in FIG. 5.

When the answer is YES in step 101, the procedure proceeds to step 102 in which a variation in engine speed "NS" is computed every when the target EGR opening degree "E" is increased by the step amount "A". The target EGR opening degree "E" and the engine speed variation "NS" are stored for each time until the target EGR opening degree "E" becomes greater than or equal to the specified value "B" (steps 103-106).

Then, the procedure proceeds to step 107 in which the target EGR opening degree "E" is set to the specified degree "E(1)". Then, the procedure proceeds to step 108 in which the target EGR opening degree "E" is decreased by the specified step amount "A". Then, the procedure proceeds to step 109 in which a current engine speed variation "NS" is computed. Then, the procedure proceeds to step 110 in which the current target EGR opening degree "E" and the engine speed variation "NS" are stored in a memory. Then, the procedure proceeds to step 111 in which the computer determines whether the target EGR opening degree "E" is less than or equal to a specified value "−B".

When the answer is YES in step 111, the procedure proceeds to step 112a. In step 112a, when the EGR opening degree is varied (increased or decreased) from the specified degree "E(1)", an average of a maximum value and a minimum value of the EGR opening degrees where the engine speed variation "NS" becomes minimum is learned as the full-close position. The target EGR opening degree "E" is set to the full-close position.

If the engine speed variation "NS" becomes minimum at a single EGR opening degree, this EGR opening degree is learned as the full-close position.

Then, the procedure proceeds to step 113 in which the full-close position is stored in the backup RAM of the ECU

30. While the engine is at idling state, the learning of the full-close position may be performed only once.

Referring to a time chart shown in FIG. 9, the processing of the full-close position learning will be described, hereinafter. While the engine 11 is idling, the specified step amount "A" is successively added to the degree "E(1)" and the engine speed variation "NS" is successively computed until the target EGR opening degree "E" becomes greater than or equal to the specified value "B". After that, the specified step amount "A" is successively reduced from the degree "E(1)" and the engine speed variation "NS" is successively computed until the target EGR opening degree "E" becomes less than or equal to the specified value "−B".

After that, when the EGR opening degree is varied (increased or decreased) from the specified degree "E(1)", an average of a maximum value and a minimum value of the EGR opening degrees where the engine speed variation "NS" becomes minimum is learned as the full-close position. The target EGR opening degree "E" is set to the full-close position. In FIG. 9, an average degree "E(8)" of "E(2)" and "E(5)" is learned as the full-close position.

According to the second embodiment, when the EGR opening degree is varied (increased or decreased) from the specified degree, an average of the maximum value and the minimum value of the EGR opening degrees where the variation in engine speed becomes minimum is learned as the full-close position. Thus, even if a dead zone where the EGR gas quantity becomes minimum exists, the average of the maximum value and the minimum value of the EGR opening degrees where the EGR gas quantity becomes minimum can be learned as the full-close position. Further, since the average value is learned as the full-close position, the EGR gas quantity (EGR gas leak) can be surely reduced when the EGR opening degree is set to the full-close position.

Only when the engine is at first idling state after the engine is started, the full-close position learning may be executed. Alternatively, when the engine is at idling state after a specified time period is elapsed since the last full-close position learning, the full-close position learning may be executed.

[Third Embodiment]

Figure 10:
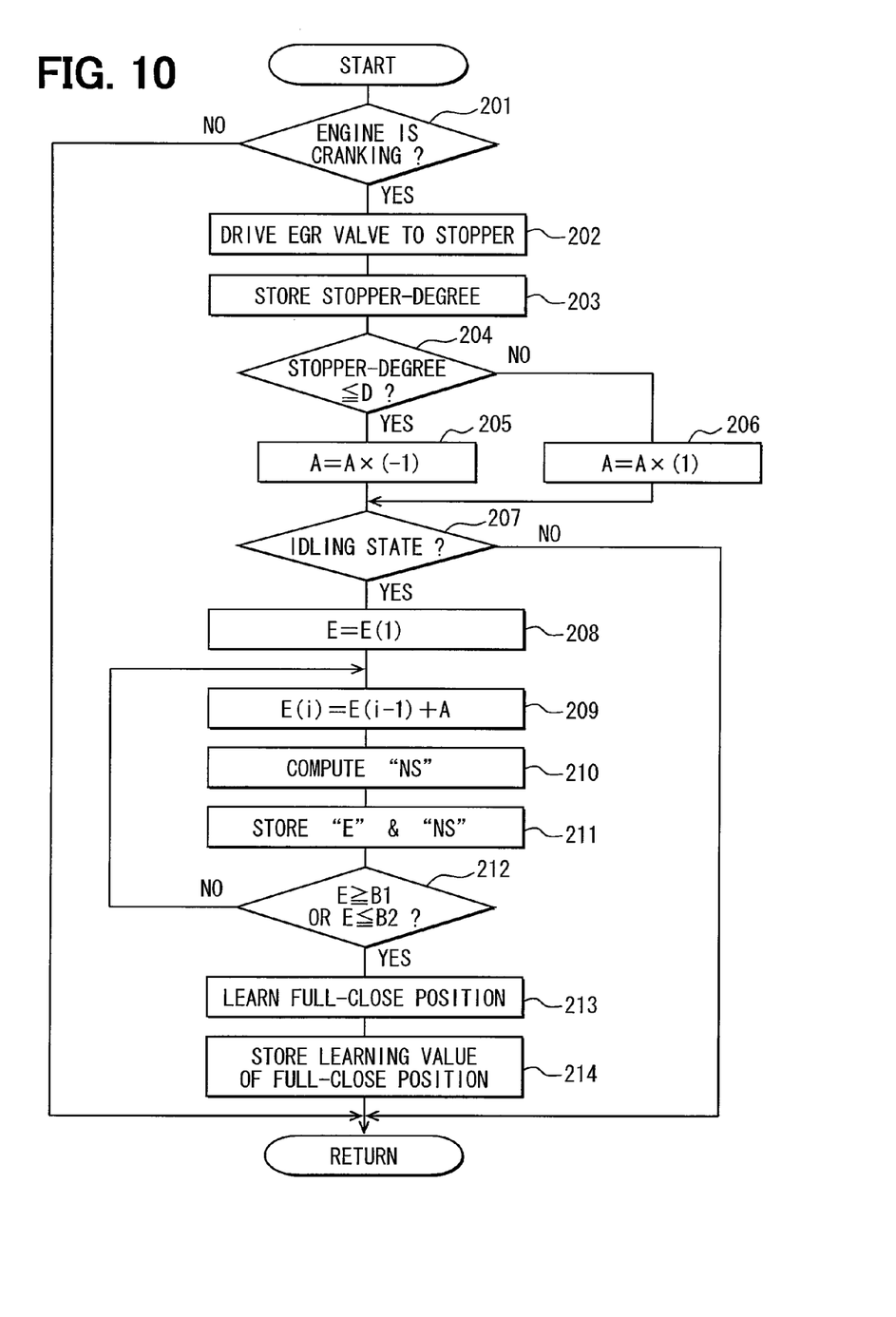
FIG. 10 is a flow chart showing a processing of a full-close-position learning routine according to a third embodiment.
Figure 11:
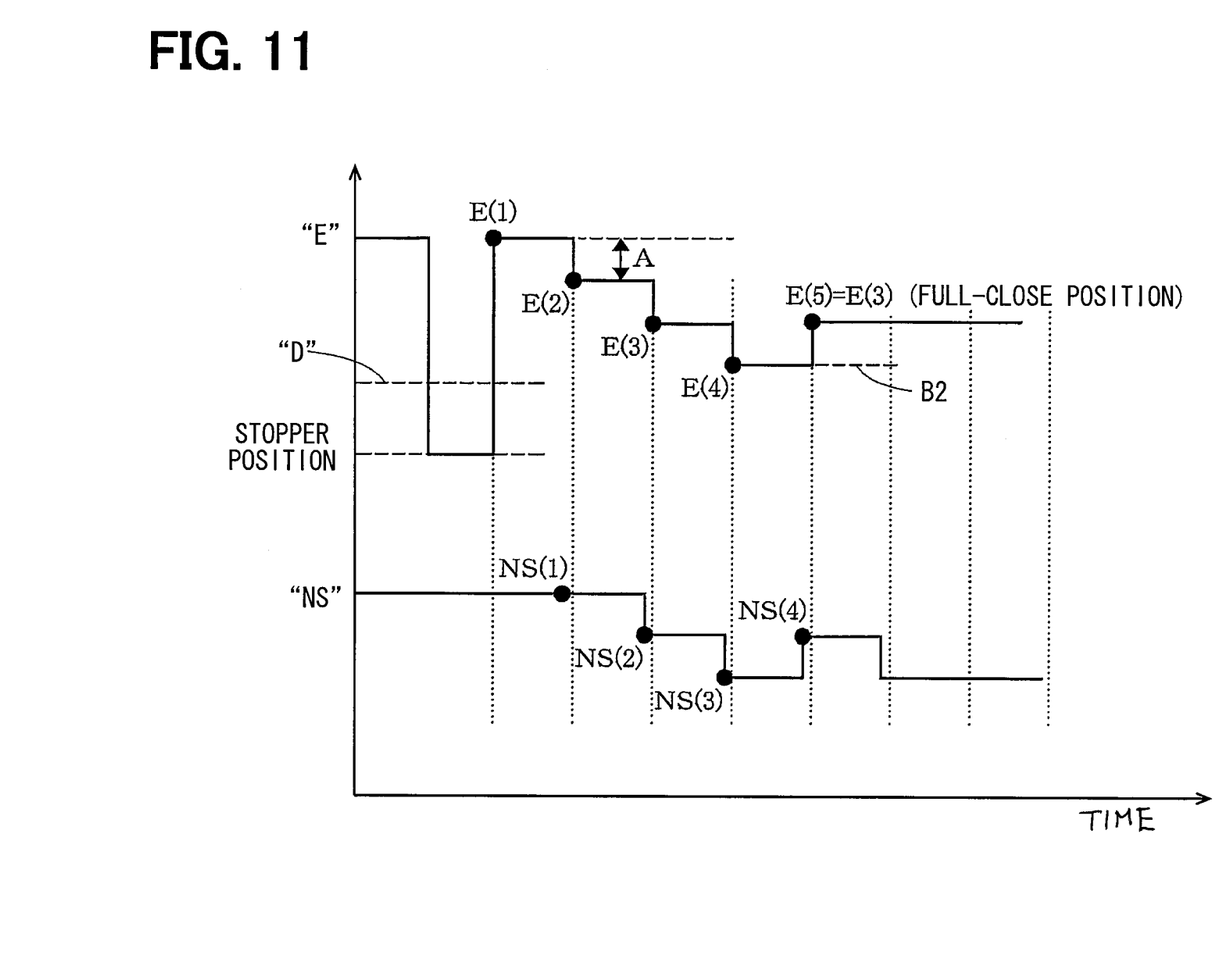
FIG. 11 is a time chart for explaining a full-close-position learning according to the third embodiment.

Referring to FIGS. 10 and 11, a third embodiment will be described hereinafter. In the third embodiment, the same parts and components as those in the first embodiment are indicated with the same reference numerals and the same descriptions will not be reiterated.

In the third embodiment, the ECU 30 performs a full-close-position learning routine shown in FIG. 10. First, the EGR valve 26 is rotated to a limit position in a movable range thereof. This limit position corresponds to a position of the stopper 31. At this moment, the sensor 27 detects an opening degree of the EGR valve 26. Based on this detected degree, the computer determines whether the full-close position deviates from the specified position (for example, initially designed full-close position) in an increasing direction or a decreasing direction. The computer determines the direction in which the EGR valve 26 is rotated from the specified position through the full-close position. After that, based on a variation in engine speed of when the EGR valve 26 is rotated from the specified position in the above direction, the computer learns the full-close position.

In step 201, it is determines whether the engine 11 is cranking. When the answer is NO in step 201, the procedure ends.

When the answer is YES in step 201, the procedure proceeds to step 202. In step 202, the EGR valve 26 is rotated until the EGR valve 26 is brought into contact with the stopper 31. That is, the EGR valve 26 is rotated to the limit position in a movable range thereof.

Then, the procedure proceeds to step 203, the opening degree detected by the sensor 27 is stored as a stopper-degree. In step 204, the computer determines whether the stopper-degree is less than or equal to a specified value "D". This specified value "D" is an initially designed limit position in a movable range of the EGR valve 26. That is, the value "D" corresponds to an initially designed position of the stopper 31.

When the answer is YES in step 204, the computer determines that the full-close position deviates in a minus direction relative to the specified opening degree (initially designed full-close position). The procedure proceeds to step 205 in which the step amount "A" is set to a minus value, whereby the computer determines that the rotating direction of the EGR valve 26 is a direction in which the opening degree of the EGR valve 26 is decreased from the specified opening degree.

When the answer is NO in step 204, the computer determines that the full-close position deviates in a plus direction relative to the specified opening degree (initially designed full-close position). The procedure proceeds to step 206 in which the step amount "A" is set to a plus value, whereby the computer determines that the rotating direction of the EGR valve 26 is a direction in which the opening degree of the EGR valve 26 is increased from the specified opening degree.

Then, the procedure proceeds to step 207 in which the computer determines whether the engine 11 is at idling state. When the answer is NO, the procedure ends.

When the answer is YES in step 207, the procedure proceeds to step 208. In step 208, a target EGR opening degree "E" is set to a specified degree and the opening degree of the EGR valve 26 is brought into the specified degree.

Then, the procedure proceeds to step 209 in which the target EGR opening degree "E" is varied by the specified step amount "A" and the EGR opening degree is varied by the step amount "A".

Target EGR opening degree $E(i)$=Target EGR opening degree $E(i-1)+A$

In a case that the step amount "A" is a minus value, the target EGR opening degree is decreased and the EGR opening degree is also decreased. In a case that the step amount "A" is a plus value, the target EGR opening degree is increased and the EGR opening degree is also increased.

Then, the procedure proceeds to step 210 in which a current engine speed variation "NS" is computed. Then, the procedure proceeds to step 211 in which the current target EGR opening degree "E" and the engine speed variation "NS" are stored in a memory.

Then, the procedure proceeds to step 212. In a case that the target EGR opening degree "E" is increasing, the computer determines whether the target EGR opening degree "E" is greater than a specified value "B1". In a case that the target EGR opening degree "E" is decreasing, the computer determines whether the target EGR opening degree "E" is less than a specified value "B2".

When the computer determines that the target EGR opening degree "E" is less than "B1" (or greater than "B2) in step 212, the procedure goes back to step 209.

When the computer determines that the target EGR opening degree "E" is greater than or equal to "B1" (or less than or equal to "B2") in step 212, the procedure proceeds to step 213, In step 213, the EGR opening degree is varied (increased or decreased) from the specified degree "E(1)" and a maximum value of the EGR opening degrees where the engine speed variation "NS" becomes minimum is learned as the full-close position. The target EGR opening degree is set to the full-close position. If the engine speed variation "NS" becomes minimum at a single EGR opening degree, this EGR opening degree is learned as the full-close position.

Then, the procedure proceeds to step 214 in which the full-close position is stored in the backup RAM of the ECU 30.

Referring to a time chart shown in FIG. 11, the processing of the full-close position learning will be described, hereinafter. When the EGR valve 26 is brought into a contact with the stopper 31 at cranking state, the opening degree of the EGR valve 26 is stored in a memory as a stopper-degree.

When this stopper-degree is less than or equal to the specified value "D", the computer determines that the full-close position deviates in a minus direction relative to the specified opening degree (initially designed full-close position). The computer determines that the rotating direction of the EGR valve 26 is a direction in which the opening degree of the EGR valve 26 is decreased from the specified opening degree through the full-close position. Meanwhile, when this stopper-degree is greater than the specified value "D", the computer determines that the full-close position deviates in a plus direction relative to the specified opening degree. The computer determines that the rotating direction of the EGR valve 26 is a direction in which the opening degree of the EGR valve 26 is increased from the specified opening degree through the full-close position.

After that, while the engine is idling, the target EGR opening degree "E" is successively varied from the degree "E(1)" by the specified step amount "A" and the engine speed variation "NS" is successively computed until the target EGR opening degree "E" becomes greater than or equal to specified value "B1" (or less than "B2"). After that, when the EGR opening degree is varied (increased or decreased) from the specified degree "E(1)", a maximum value of the EGR opening degrees where the engine speed variation "NS" becomes minimum is learned as the full-close position. The target EGR opening degree "E" is set to the full-close position. In FIG. 11, the target EGR opening degree "E(5)=E(3)" is learned as the full-close position.

According to the third embodiment, when learning the full-close position, the EGR valve 26 is rotated in either increasing direction or decreasing direction. Thus, a time period for learning can be shortened.

According to the third embodiment, when the EGR opening degree is varied (increased or decreased) from the specified degree, the maximum value of the EGR opening degrees where the variation in engine speed becomes minimum is learned as the full-close position. However, when the EGR opening degree is varied (increased or decreased) from the specified degree, an average of the maximum value and the minimum value of the EGR opening degrees where the variation in engine speed becomes minimum may be learned as the full-close position.

In the above first to third embodiments, the full-close position is learned based on the variation in engine speed when the EGR opening degree is varied (increased or decreased) from the specified degree. However, the full-close position can be learned based on an engine speed variation when the EGR opening degree is increased from a degree smaller than the specified degree to a degree larger than the specified degree. Alternatively, the full-close position can be learned based on an engine speed variation when the EGR opening degree is decreased from a degree larger than the specified degree to a degree smaller than the specified degree.

The full-close position may be learned based on a correction value for restricting a variation in engine speed. The correction value includes an idle speed control value, an ignition timing correction value, a fuel injection quantity correction value and the like. As shown in FIG. 3, the EGR gas quantity varies according to the EGR opening degree, and a combustion condition of the engine 11 varies according to the EGR gas quantity. When the combustion condition varies, a variation in engine speed (for example, a standard deviation in engine speed) also varies. Further, the correction values (an idle speed control value, an ignition timing correction value, a fuel injection quantity correction value) also vary. Thus, based on the correction values, the full-close position of the EGR valve can be accurately learned.

The full-close-position learning can be executed while the engine 11 is running other than idling.

The present disclosure can be applied to an engine provided with a turbocharger, a mechanical supercharger or an electrical supercharger.

The present disclosure can be applied to an engine provided with a low-pressure-loop (LPL) type EGR apparatus in which the exhaust gas is recirculated from downstream of an exhaust turbine in the exhaust pipe to upstream of a compressor in the intake pipe. Also, the present disclosure can be applied to a high-pressure-loop (HPL) type EGR apparatus in which the exhaust gas is recirculated from upstream of the exhaust turbine in the exhaust pipe to downstream of the compressor in the intake pipe.

What is claimed is:

1. An exhaust gas recirculation controller for an internal combustion engine, comprising:
    an EGR valve controlling an exhaust gas quantity recirculating into an intake pipe, the EGR valve being driven in a direction where an opening degree of the EGR valve is increased and in a direction where the opening degree of the EGR valve is decreased with respect to a full-close position of the EGR valve where the recirculating exhaust gas quantity becomes a minimum value; and
    a full-close-position learning portion for learning the full-close position based on a variation in speed of the internal combustion engine relative to the opening degree of the EGR valve, wherein
    the full-close-position learning portion determines a direction in which the opening degree of the EGR valve is varied from the specified opening degree based on the opening degree of the EGR valve of when the EGR valve is driven to a limit position within a movable range thereof; and
    the full-close-position learning portion learns the full-close-position based on the variation in speed of the internal combustion engine when the opening degree of the EGR valve is varied from the specified opening degree, wherein:
    the full-close-position learning portion learns a maximum value of the opening degree as the full-close position, in which the variation in speed of the internal combustion engine becomes a minimum value when the opening degree of the EGR valve is varied.

2. The exhaust gas recirculation controller for an internal combustion engine, according to claim 1, wherein:

the full-close-position learning portion stores a learning value of the full-close position in a rewritable nonvolatile memory.

3. An exhaust gas recirculation controller for an internal combustion engine, comprising:
- an EGR valve controlling an exhaust gas quantity recirculating into an intake pipe, the EGR valve being driven in a direction where an opening degree of the EGR valve is increased and in a direction where the opening degree of the EGR valve is decreased with respect to a full-close position of the EGR valve where the recirculating exhaust gas quantity becomes a minimum value; and
- a full-close-position learning portion for learning the full-close position based on a correction amount for restricting a variation in speed of the internal combustion engine relative to the opening degree of the EGR valve, wherein
the full-close-position learning portion determines a direction in which the opening degree of the EGR valve is varied from the specified opening degree based on the opening degree of the EGR valve of when the EGR valve is driven to a limit position within a movable range thereof; and
the full-close-position learning portion learns the full-close-position based on the correction amount when the opening degree of the EGR valve is varied from the specified opening degree, wherein:
the full-close-position learning portion learns a maximum value of the opening degree as the full-close position, in which the correction amount becomes minimum value when the opening degree of the EGR valve is varied.

4. The exhaust gas recirculation controller for an internal combustion engine, according to claim 3, wherein:
the full-close-position learning portion stores a learning value of the full-close position in a rewritable nonvolatile memory.

* * * * *